United States Patent
Solèn et al.

(10) Patent No.: US 7,303,130 B2
(45) Date of Patent: Dec. 4, 2007

(54) METHOD AND DEVICE FOR RECORDING OF DATA

(75) Inventors: Staffan Solèn, Lund (SE); Martin Sjölin, Lund (SE)

(73) Assignee: Anoto Group AB, Lund (SE)

( * ) Notice: Subject to any disclaimer, the term of this patent is extended or adjusted under 35 U.S.C. 154(b) by 84 days.

(21) Appl. No.: 10/825,428

(22) Filed: Apr. 16, 2004

(65) Prior Publication Data

US 2004/0256462 A1 Dec. 23, 2004

(30) Foreign Application Priority Data

Apr. 17, 2003 (SE) .................................... 0301143

(51) Int. Cl.
*G06K 5/04* (2006.01)

(52) U.S. Cl. ..................... 235/462.12; 235/462.01; 235/462.09; 235/462.25

(58) Field of Classification Search ........... 235/462.25, 235/462.08, 462.09, 462.11, 462.12, 462.16, 235/462.19

See application file for complete search history.

(56) References Cited

U.S. PATENT DOCUMENTS

| | | | |
|---|---|---|---|
| 5,504,319 A * | 4/1996 | Li et al. ................. | 235/462.08 |
| 5,635,697 A | 6/1997 | Shellhammer et al. | |
| 5,756,981 A | 5/1998 | Roustaei et al. | |
| 5,837,986 A | 11/1998 | Barile et al. | |
| 5,902,987 A | 5/1999 | Coffman et al. | |
| 5,979,768 A | 11/1999 | Koenck | |
| 6,047,893 A * | 4/2000 | Saporetti ................. | 235/462.1 |
| 6,343,740 B1 | 2/2002 | Ju et al. | |
| 6,637,658 B2 * | 10/2003 | Barber et al. .......... | 235/462.45 |
| 2001/0023896 A1 | 9/2001 | He et al. | |
| 2002/0020747 A1 | 2/2002 | Wakamiya et al. | |
| 2004/0099741 A1 * | 5/2004 | Dorai et al. ........... | 235/462.08 |

FOREIGN PATENT DOCUMENTS

| | | |
|---|---|---|
| EP | 0 449 645 A1 | 10/1991 |
| WO | WO 01/93183 A1 | 12/2001 |

* cited by examiner

*Primary Examiner*—Seung Ho Lee
(74) *Attorney, Agent, or Firm*—Birch, Stewart, Kolasch & Birch, LLP

(57) ABSTRACT

The invention relates to a method for recording a bar code comprising a plurality of base elements. A reading device generates a sequence of partially overlapping images which together reproduce the bar code. Images are analysed to produce information which describes the positions of the base elements in each image. The bar code is then reconstructed by putting together information that has been extracted from the subimages, so that the contents of the bar code can be interpreted. In reconstruction, the position information and the images are used. By using the image information, the putting together process can be made less calculation-intensive. The invention also relates to a corresponding device and a corresponding computer program.

22 Claims, 12 Drawing Sheets

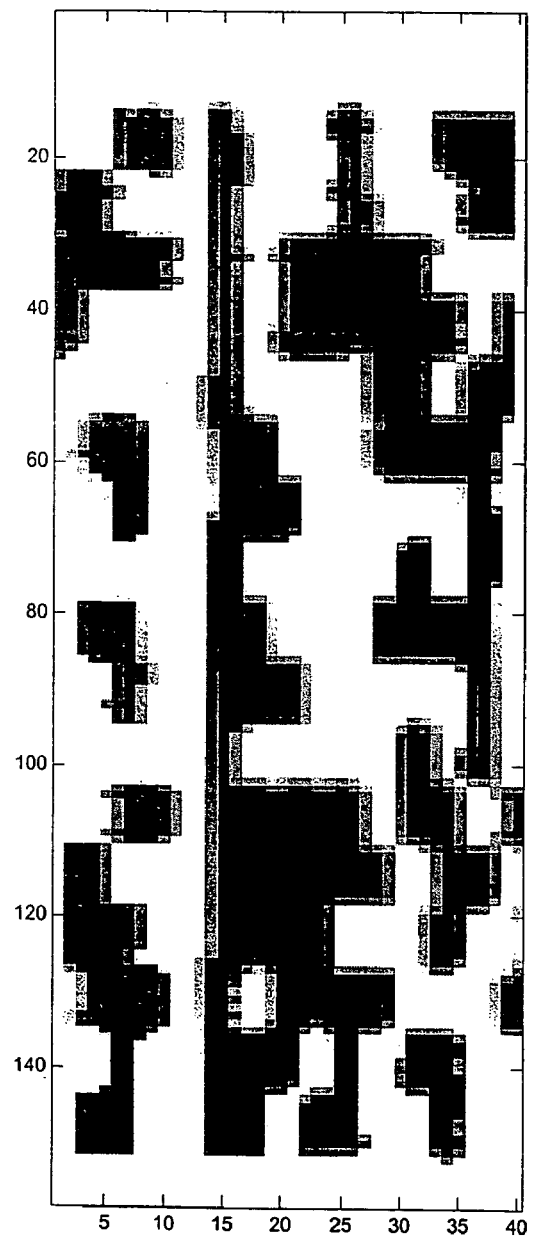
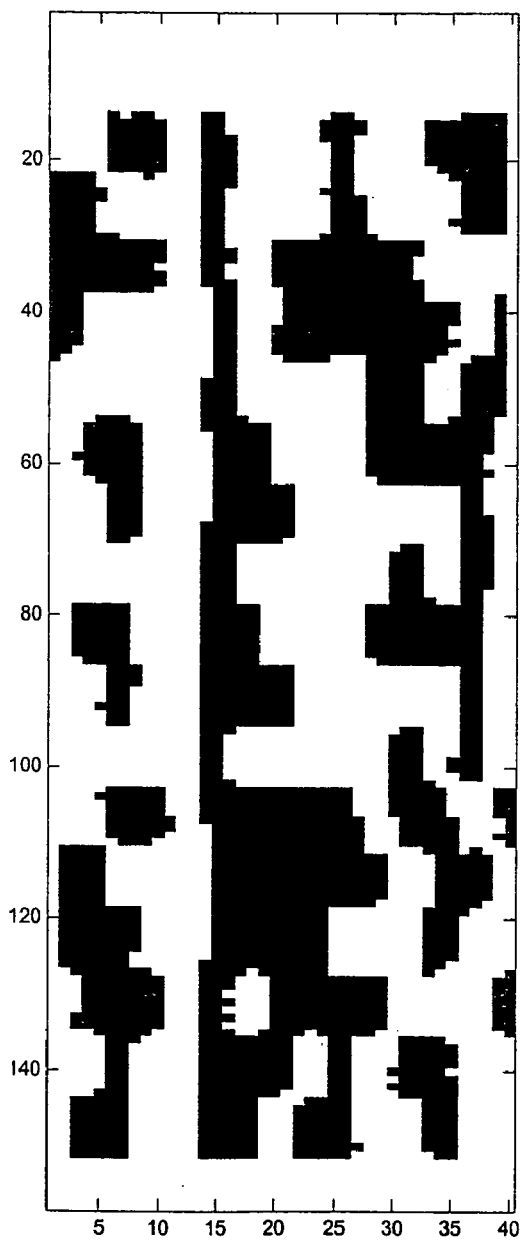
Fig 8                    Fig 9

METHOD AND DEVICE FOR RECORDING OF DATA

CROSS REFERENCE TO RELATED APPLICATIONS

This application claims the benefit of Application No. SE 0301143-4, filed in Sweden on Apr. 17, 2003.

FIELD OF THE INVENTION

The invention relates to recording of a bar code by means of a plurality of partially overlapping images.

BACKGROUND ART

A method for recording a bar code, in which a reading device captures a sequence of images of the bar code, successive images being partially overlapping, is described in WO 01/93183. This method comprises finding edges in the images and finding the most probable displacement of succeeding images in order to enable reconstruction of the bar code.

In such a method, the reconstruction of the bar code occurs on the basis of the edges of the bars.

Such a method is mainly suitable for recording one-dimensional bar codes.

Another conceivable method is instead to put together subimages of a bar code pixel by pixel, for example by means of two-dimensional correlation, but in practice this method is too calculation-intensive.

SUMMARY OF THE INVENTION

An object of the present invention is to provide effective recording also of two-dimensional bar codes.

According to a first aspect, the invention relates to a method for recording a bar code comprising a plurality of base elements, said method using a sequence of images from an image sensor, which together reproduce the bar code, images in the sequence being partially overlapping. The method comprises the steps of a) generating base element position information regarding borders of base elements in the images by analysing the images in the sequence, and b) reconstructing the bar code by using the contents of the various images and the base element position information.

Consequently the reconstruction of the bar code is made considerably more effective, compared with, for instance, putting together pixel by pixel, since it can be carried out with knowledge of where in the images the borders of the base elements are to be found. This reduces on the one hand the number of possible ways of putting together information that corresponds to two successive images, since base elements that are to be found in both images must have corresponding borders and, on the other hand, the corresponding volume of information of an image can be reduced by determining the value of the base element using the base element position information. This, too, allows more effective reconstruction of the bar code.

According to one embodiment, step a) comprises the following steps: detecting edges in an image, detecting directions of extension of the edges in the image, and rotating the image, so that the directions of extension of the edges correspond to the direction of extension of rows or columns of pixels in the image.

This makes it easier to produce the base element position information. In one embodiment, the detection of the directions of extension of the edges is performed using a Hough transform.

In step a) one-dimensional data can be created and frequency analysed for each image, said one-dimensional data describing the existence of intensity changes along a predetermined direction in the image. One-dimensional frequency analysis is less calculation-intensive than two-dimensional.

In one embodiment, the above one-dimensional data comprises for each image a row transition vector, in which the elements have values which are representative of the amounts of intensity changes along a plurality of columns in the image, and a column transition vector, in which the elements have values which are representative of the amounts of intensity changes along a plurality of rows in the image.

Thus step a) may comprise the following steps: thresholding pixels in the image, so that the pixels assume one of two binary values, generating a row transition vector, in which each element has a value which is representative of the number of transitions, in a plurality of columns in the image, from one binary value to the other between two adjoining rows, generating a column transition vector, in which each element has a value which is representative of the number of transitions, in a plurality of rows in the image, from one binary value to the other between two adjoining columns, and frequency analysing the row transition vector and the column transition vector.

The use of row transition and column transition vectors results in very effective reduction of the volume of information in an image, without the information which is relevant to the production of the base element position information being lost to any great extent.

In one embodiment, the frequency analysis is performed using an FFT algorithm.

In step b) the base element information concerning the values of the base elements can for each image be extracted based on the image and the base element position information, and the bar code is reconstructed based on the base element information. This results in a great reduction of the volume of information in reconstruction, thus making reconstruction more effective.

In one embodiment, the base element position information is a grid which defines the borders of the base elements in the image, said grid being applied to the image, and the value of each base element is determined based on the pixels in the image which are defined by the grid as belonging to this base element.

The algorithm which determines the value of the base element can be configured in such a manner that pixels at a great distance from the borders of a base element have greater weight than pixels close to the borders. This makes the algorithm more reliable.

The base element information for each base element thus has less information contents than the corresponding part of the original image. In one embodiment, the base element information of each base element is represented by a bit. This results in a maximum reduction of the volume of information that describes an image.

The bar code can be a two-dimensional bar code, for instance a type PDF417 bar code.

According to a second aspect, the invention relates to a system for recording a bar code comprising a plurality of base elements, which system uses a sequence of images which together reproduce the bar code, images in the sequence being partially overlapping. The system comprises means for generating base element position information regarding borders of base elements in the images by analysing the images in the sequence, and means for reconstructing the bar code by using the contents of the various images and the base element position information. The system gives advantages corresponding to those of the above method and can be varied in the same way. In general, the system comprises means for carrying out the steps of the method.

If the bar code is a type PDF417 bar code, the vertical extent of the images can be such as to allow them to cover the full height of the bar code. This allows the bar code to be recorded in its entirety in one straight sweep.

According to a third aspect, the invention relates to a computer program for recording a bar code comprising a plurality of base elements, a sequence of images from an image sensor being used, which together reproduce the bar code, images in the sequence being partially overlapping. The program comprises instructions corresponding to the steps a) that base element position information regarding borders of base elements in the images is generated by analysing the images in the sequence, and b) that the bar code is reconstructed by using the contents of the various images and the base element position information.

According to a fourth aspect, the invention relates to a digital storage medium comprising such a computer program. The storage medium is readable by a computer system that can execute the program. The computer program gives advantages corresponding to those of the above method and can be varied in the same way. In general, the computer program then comprises instructions for carrying out the steps of the method.

BRIEF DESCRIPTION OF THE DRAWINGS

FIG. 8 shows the image of FIG. 5 after rotation.

FIG. 9 shows the image of FIG. 8 after binarisation.

DEFINITIONS

By bar code is meant graphical codes with simple symbols which are in the first place suitable and intended for computer-based recording and interpretation. In contrast to printed text, they are however less suitable for manual reading and interpretation. The term bar codes thus comprise not only one-dimensional codes containing parallel bars (for instance EAN codes) but also relates to two-dimensional bar codes (for instance PDF417).

By base element is meant in this application text the smallest symbols which build the bar code. In the case of PDF417, the base elements consist of rectangles, for instance, in the size of 0.3×0.9 mm, which can be black or white.

By base element position information is meant information regarding the positions of base elements in an image, e.g. a definition of their borders or an indication of one or more-coordinates in a base element of known extension.

DESCRIPTION OF EMBODIMENTS

Figure 1:
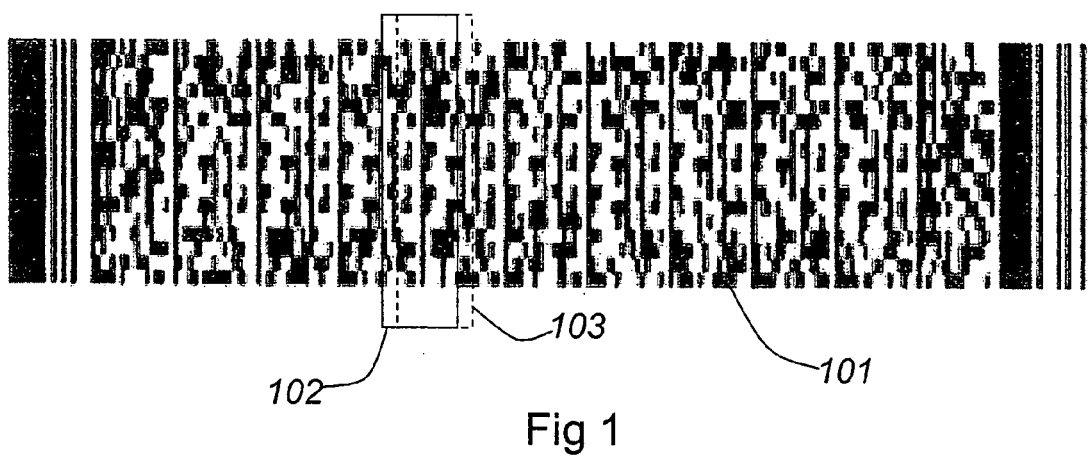
FIG. 1 illustrates an example of a two-dimensional bar code.

FIG. 1 shows an example of a two-dimensional bar code. The bar code 101 is in this case of the type PDF417.

According to the invention, a sequence of images will be captured by a reading device, which images together reproduce the bar code. FIG. 1 indicates a conceivable image field of a first image 102 and a second image 103 which comes immediately after the first image in the sequence of images. As is evident, the images are partially overlapping. By passing the reading device across the bar code and generating a sequence of images, which cover the entire bar code, this can be recorded.

Figure 2:
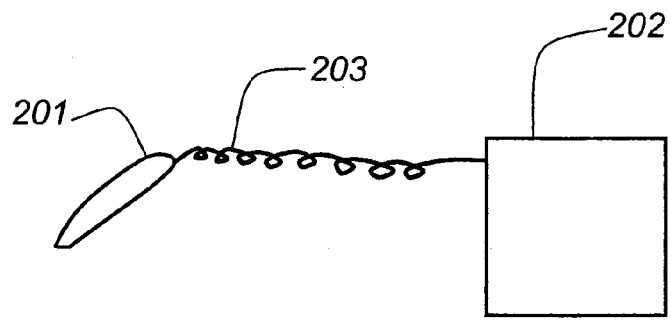
FIG. 2 illustrates a bar code reader.

FIG. 2 illustrates a reading device in the form of a bar code reader 201. The bar code reader 201 is connected to a system 202, for instance a personal computer, which can benefit by the information that is recorded by the bar code reader 201. The connection can, as illustrated, be made by a cable 203, but alternatively RF or IR communication can be used. A further option is to store recorded information in the reading device, and transfer the information when the reading device is placed in a docking unit. Also other methods of communication between bar code reader and system are conceivable.

The reading device comprises in a manner known per se a focal aperture for letting in light to an image sensor, and optics for correct projection of incident light on the sensor. Suitably, the reading device is configured so as to be able to record a bar code which can be printed on a base, when being passed across the base in mechanical contact therewith. This allows utilisation of fixed, simple optics in the reading device. However, the reading device can, in the alternative, have optics that allow for reading at a distance.

Figure 3:
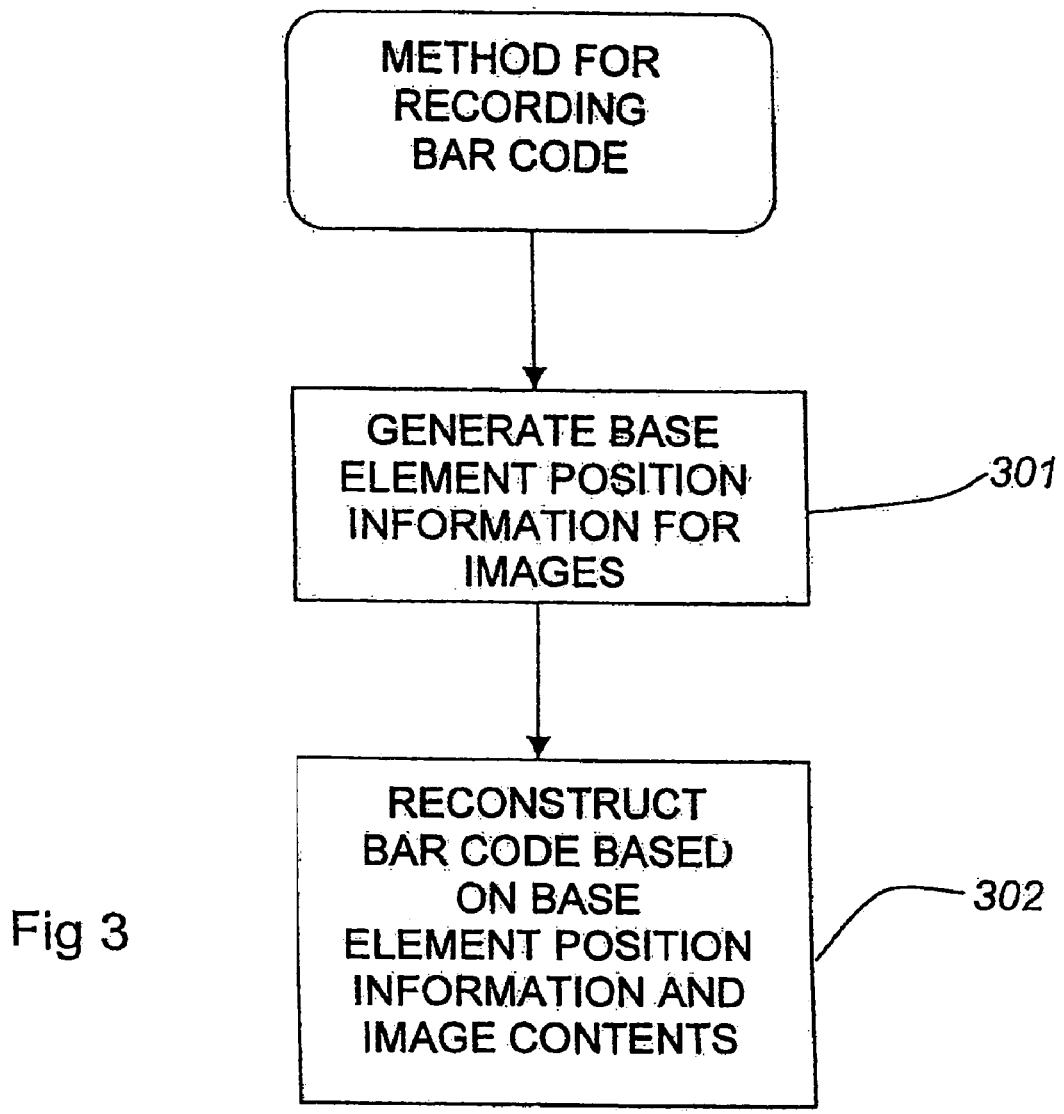
FIG. 3 is a flow chart of a method according to one embodiment of the invention.

FIG. 3 is a flow chart of a method according to one embodiment of the invention. The Figure illustrates a general method of recording a bar code comprising a plurality of base elements, i.e. a number of fields of a certain minimum size which according to blackening (reflectance) represent a given value. In accordance with the embodiment of the method, a reading device of the above type captures a sequence of images which together reproduce the bar code. The successive images are partially overlapping. The method comprises the steps of analysing 301 the images in the sequence for producing base element position information regarding borders of base elements in the image, and reconstructing 302 the bar code by using the contents of the various images and the base element position information.

EXAMPLE

Figure 4:
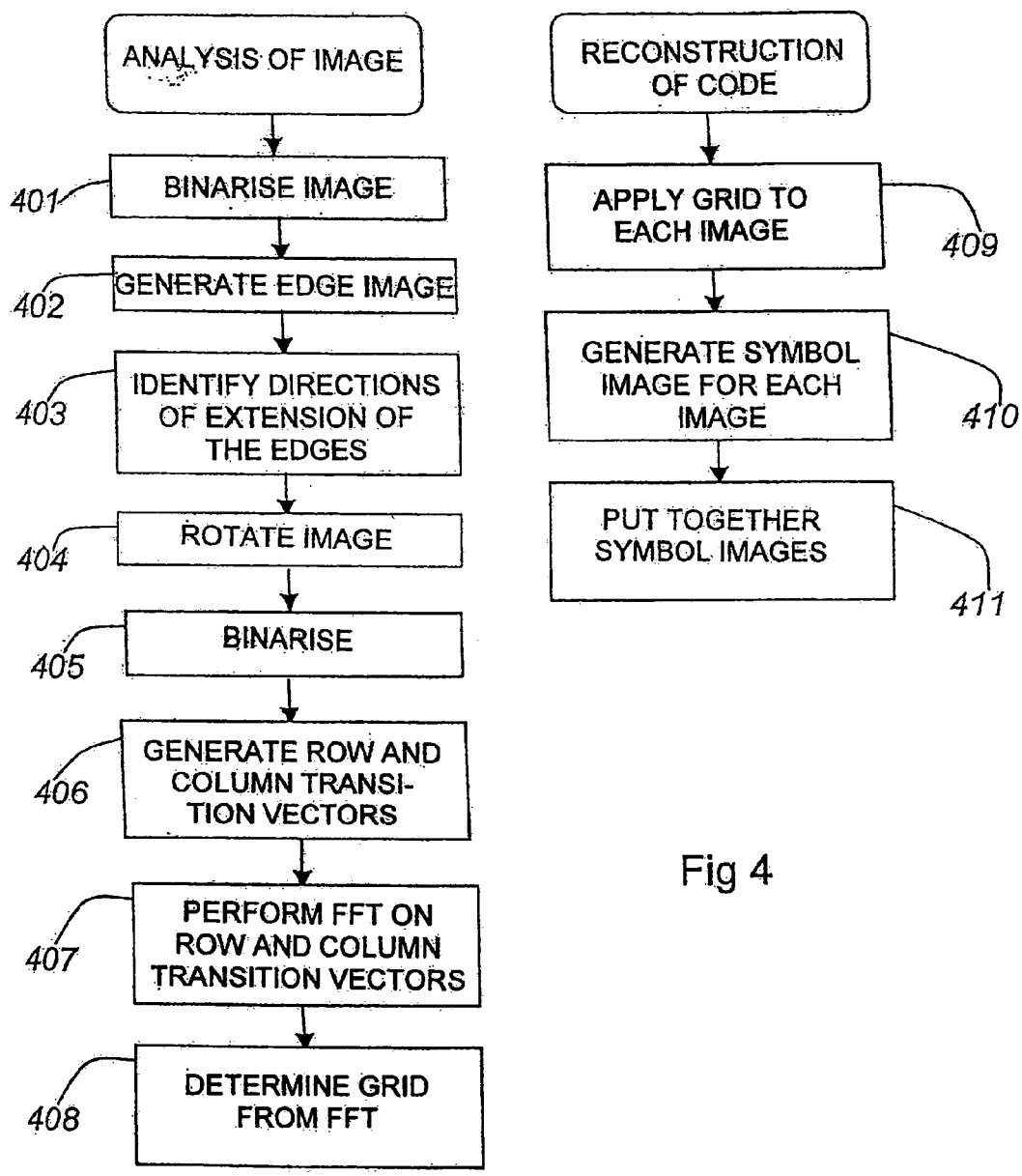
FIG. 4 is a more detailed flow chart of an embodiment of the invention.

FIG. 4 shows a more detailed flow chart of analysis and processing of an image according to an embodiment of the invention which will now be described. The description in FIG. 4 is to be read together with an example as shown in FIGS. 5-18.

Analysis of Image

Input data to the process of analysing is a digital image, which is generated, for instance, by a CCD or CMOS image sensor (CCD=Charge Coupled Device; CMOS=Complementary Metal Oxide Semiconductor) in the reading device. Such a sensor has a large number of elements which each give an output signal which is dependent on the amount of incident light on the element. After A/D conversion, a volume of information comprising these output signals is stored in a memory. The volume of information corresponds to an image. When mentioned in the following that an image is processed in a certain way, this means that such a volume of information is processed. To make the invention more distinct, prints of the image/volume of information are shown.

Figure 5:
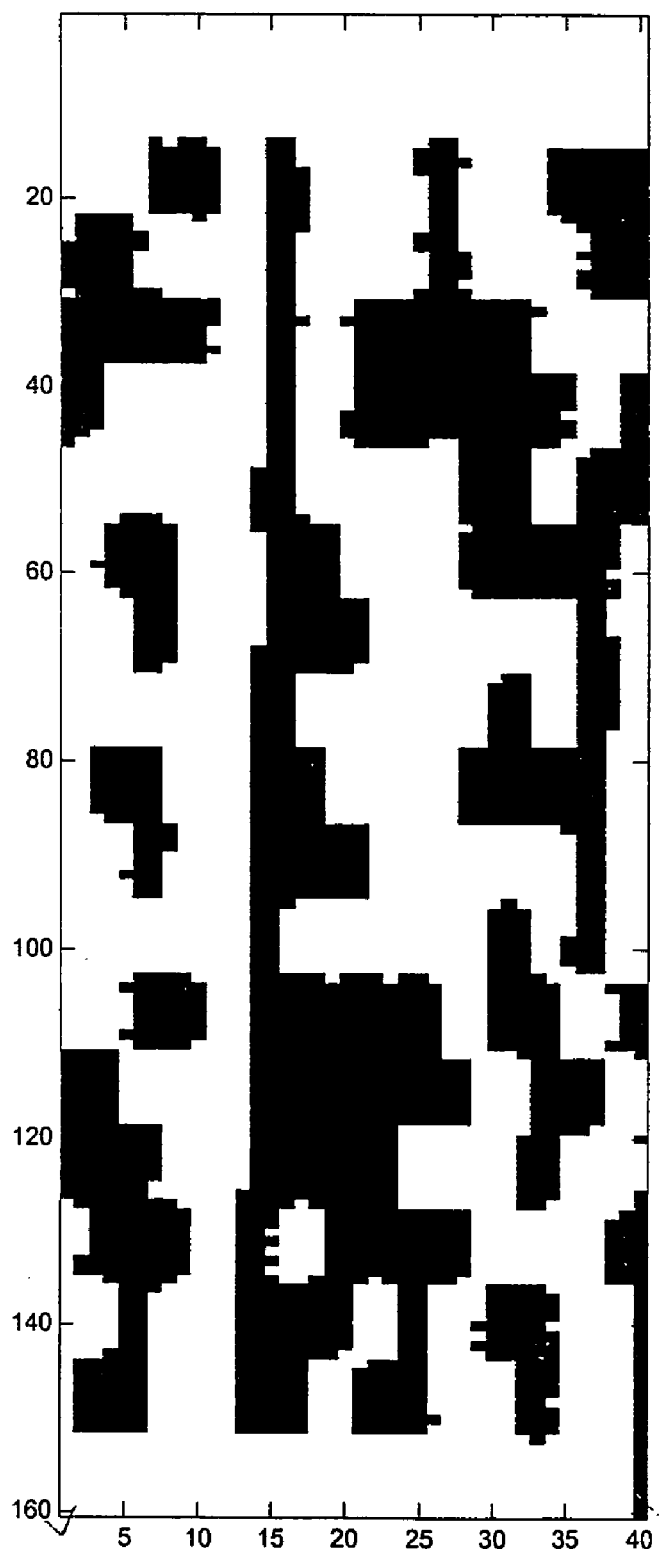
FIG. 5 shows a binarised version of a digital image.

FIG. 5 shows a binarised version of a digital image (corresponding to the field 102 in FIG. 1, but turned upside-down by the optics of the reading device) captured by a CMOS image circuit which in this case has 40*160 pixels (picture elements). Each pixel has a grey-scale value, and the image/volume of information can consequently be processed as a matrix with 40*160 grey-scale values, which together define the appearance of the image. The numbers shown at the borders of the image in FIG. 5 are thus the pixel numbers.

In a first step, the image is thus binarised (made binary) 401 by a threshold value in a manner known per se being applied to the pixels included in the image. If the grey-scale value of a pixel exceeds the threshold value, the value of this pixel is set to 1 (white), otherwise to 0 (black) (NB It is also conceivable that black represents 1 and white 0). As a result, an image with binary values is obtained, which is shown in FIG. 5. The binarising step facilitates subsequent detection of edges, but embodiments are conceivable where this step can be excluded. Alternatively, the binarisation can also be replaced by a trinarisation where two threshold values are applied and each pixel can assume one of three different values.

Figure 6:
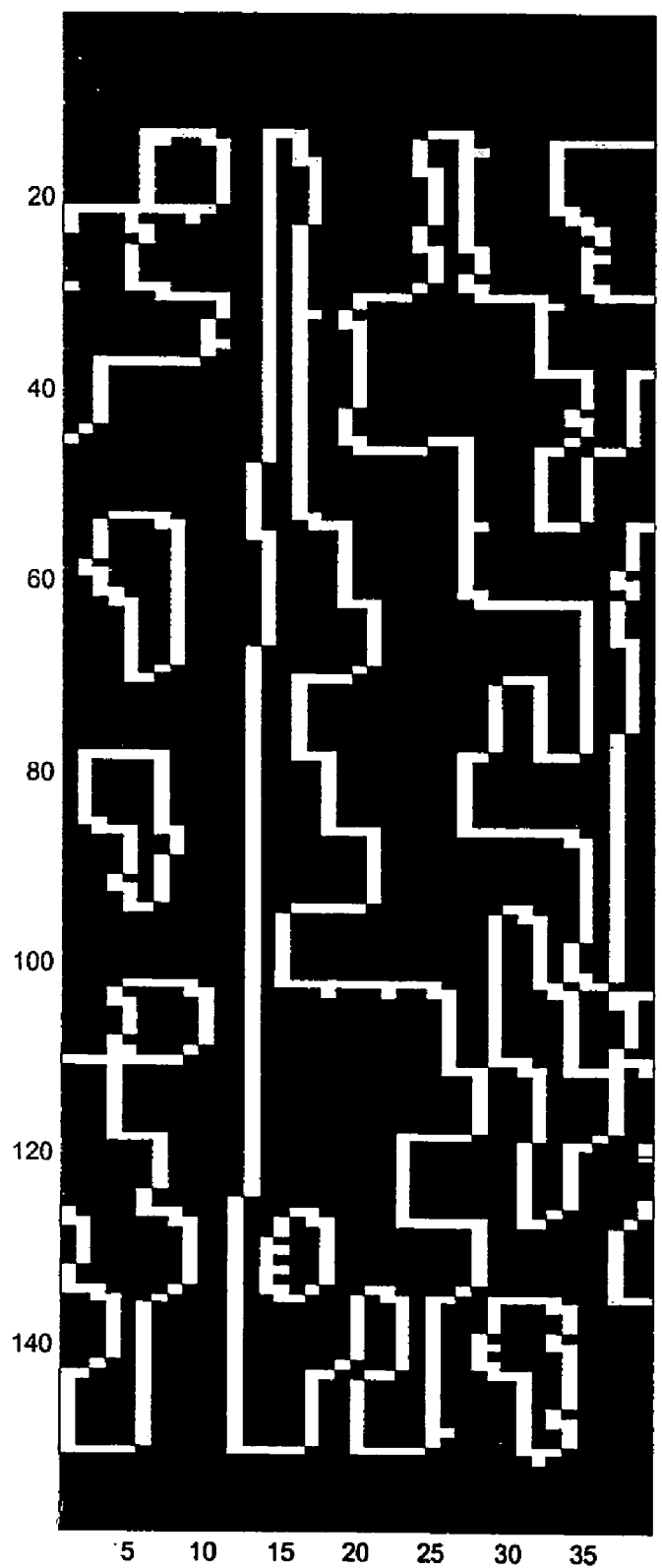
FIG. 6 shows an image corresponding to an edge matrix which is obtained by applying an edge detection filter on the digital image of FIG. 5.

In a second step, an edge detection filter is applied 402 to the binary image in FIG. 5, which produces an edge image. Such a filter generates in its simplest form for binary images the value 1 for pairs of neighbouring pixels where the pixel values in the pair differ from each other. The value 0 is given for the other pixels. The edge detection filter may e.g. be used in two perpendicular directions in the image. An image corresponding to the edge matrix is shown in FIG. 6 (pixel numbers shown at the borders of the image). As is realised by a person skilled in the art, edge detection filters can function in several other ways; for instance so-called gradient filters can be used.

In a third step, the skew of the image is estimated, i.e. how askew the bar code reader was held relative to the bar code as the image was being captured. This is done by identifying 403 the directions of extension of the edges in the Cartesian coordinate system which the edge matrix constitutes. In the embodiment, this is done in a manner known per se using a Hough transform.

Briefly, the assumption is made that the edge coordinates, i.e. the elements (x, y) in the edge matrix whose values are 1, all belong to straight lines, which at the distance r from the point 0, 0 at right angles intersect a straight line starting from the point 0, 0 at the angle θ relative to the ordinate of the coordinate system, i.e. x cos(θ)+y sin(θ)=r. Each edge coordinate thus causes a function in the r–θ space. At the points in the r–θ space where a large number of such functions intersect each other, the true values of r and θ are to be found.

Figure 7:
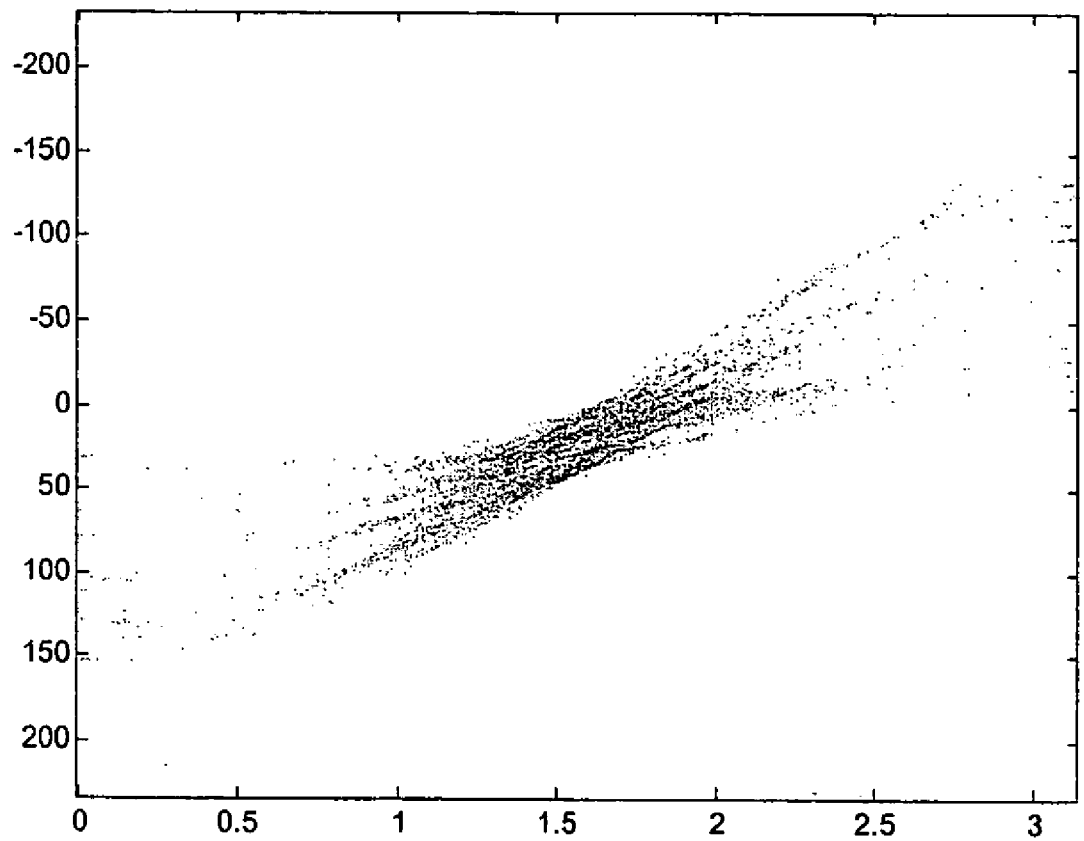
FIG. 7 illustrates the Hough transform for the edge image in FIG. 6.

FIG. 7 illustrates the Hough transform for the edge image in FIG. 6. The x-axis shows angles expressed in radians and the y-axis distances expressed in pixel units. As can be easily detected by a computer program, there is a great dominance for angles with a certain deviation from the ordinate. The rotation of the original image relative to the extension of the bar code can thus be detected.

Another possible option of finding directions of extension of edges in an image is to generate histograms which describe the luminance along bands with a certain width (some pixels), which bands extend in different directions in the image. It is then probable that histograms which exhibit quick changes in luminance along the length of the band correspond to bands which extend at right angles to edges in the image. By analysing a number of such bands using an algorithm, directions of extension of edges in the image can thus be identified.

In one embodiment of the invention, in a fourth step, the contents of the image in FIG. 5 are then rotated 404 in order to compensate for the skew. This results in an image corresponding to the one in FIG. 8. In FIG. 8 there are grey scales, which is a consequence of the fact that, in some cases, black pixels in FIG. 5 after rotation will be shared by (mapped on) several pixels in FIG. 8.

Therefore a binarisation 405 of the contents in FIG. 8 with respect to a predetermined threshold value is made once more, which results in an image corresponding to the one in FIG. 9.

The result of the process of analysing an image of part of a PDF417 bar code is so far a binary image where edges in the image extend in the same directions as rows and columns of pixels in the image. This is due to the fact that the base elements of the bar code are rectangular. Thus, the image now has no skew relative to the bar code.

In the case where images of a bar code are captured in such a manner that no skew arises, the above steps for identification of directions of extension and for rotation are not necessary. This can be achieved by mechanical means which help the user to hold the reading device correctly relative to the bar code.

The subsequent steps aim at finding borders of base elements in the image. In the example, a grid is searched for, defining where in the image base elements begin and end. This is suitably done by creating and frequency analysing one-dimensional data, which describe the existence of intensity changes along predetermined directions in the image.

In the method according to the embodiment of the invention as shown in FIG. 4, a row transition vector and a column transition vector are created 406 for the image in FIG. 9. By a row transition vector is meant a vector, in which each element k has a value which is representative of the number of transitions, in a plurality of, or all, columns in the image, from one binary value to the other between two adjoining rows. The row transition vector can be obtained, for example, by letting a software function step through all columns (or, for instance, every second column) in the image, for example from the top downwards. Each time a transition from one binary value to the other is detected, a corresponding element k in the row transition vector is incremented. If, for example, in column five the pixel in row n has the value 1 and the pixel in row n+1 has the value 0, the element in the vector that corresponds to the transition between row n and n+1 is incremented by one step. The row transition vector for the image in FIG. 9 is shown as a histogram in FIG. 10.

In the embodiment, the row transition vector has the same number of elements as transitions from one row to another, i.e. one smaller than the number of rows. Alternatively, the row transition vector can have the same number of elements as rows in the image. In the example above, either the element n, the element n+1, or both, is incremented.

Correspondingly, a column transition vector is created, in which each element k has a value that is representative of the number of transitions, in a plurality of (or all) rows in the image, from one binary value to the other between two adjoining columns. The column transition vector for the image in FIG. 9 is shown as a histogram in FIG. 12.

It should be noted that there are other conceivable ways of creating one-dimensional data which describes he existence of intensity changes along predetermined directions in an image. If the image is, for example, a grey-scale image, a vector element in a vector can be incremented by the absolute value of the difference in intensity from one pixel to another. The histograms in FIGS. 10 and 12 have, as is evident, significant peaks which appear at regular intervals.

In a seventh step, a frequency analysis of one-dimensional data obtained in the above manner is performed 407, for instance using a discrete Fourier transform. In the embodiment, this is done in a manner known per se using an FFT algorithm (FFT=Fast Fourier Transform).

Figure 10:
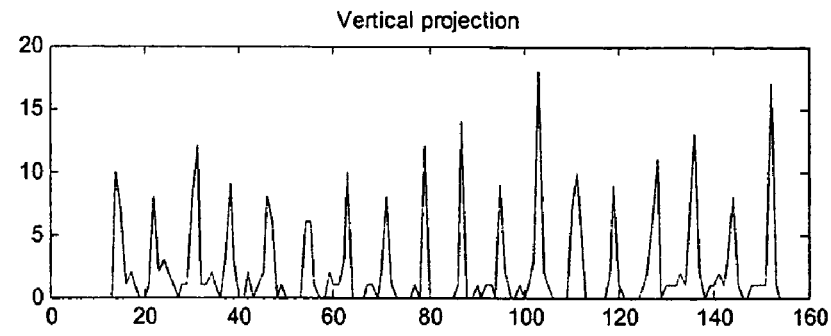
FIG. 10 shows a row transition vector for the image in FIG. 9 in the form of a histogram.
Figure 11:
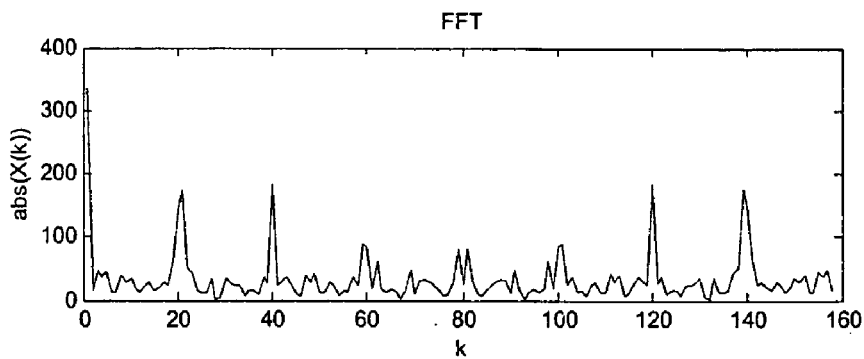
FIG. 11 shows a Fourier transform of the row transition vector in FIG. 10.
Figure 12:
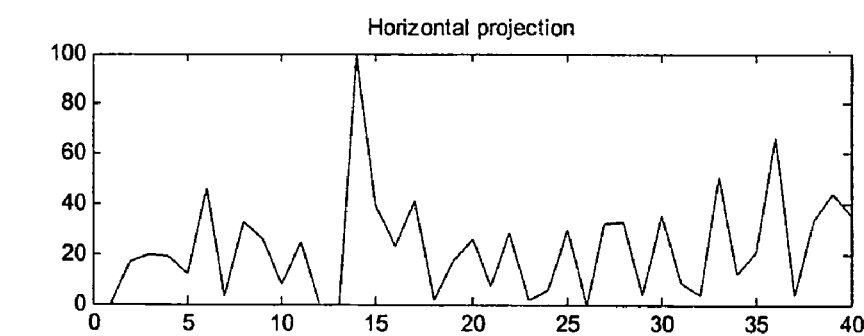
FIG. 12 shows a column transition vector for the image in FIG. 9 in the form of a histogram.
Figure 13:
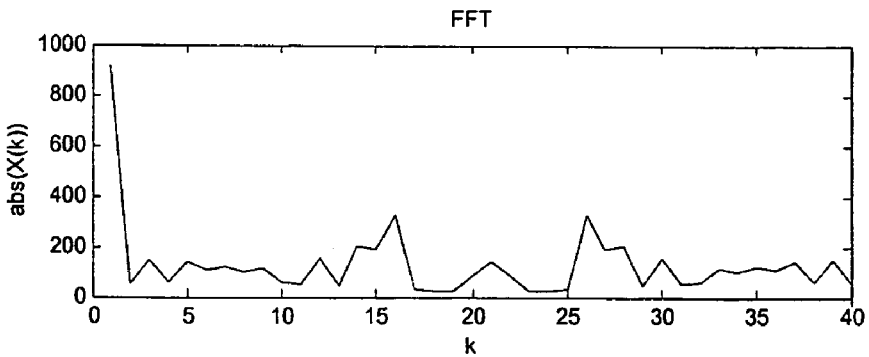
FIG. 13 shows a Fourier transform of the column transition vector in FIG. 12.

By using the FFT, the Fourier transform $X(k)$ shown in FIG. 11 is obtained for the row transition vector in FIG. 10. For the column transition vector in FIG. 11, the Fourier transform $X(k)$ shown in FIG. 13 is obtained. It is to be noted that $X(k)$ is complex, and therefore the absolute value of $X(k)$ is shown in FIGS. 11 and 13.

In the Fourier transform of the row transition vector in FIG. 11, there is a distinct peak at k=20, which, as will be appreciated by a person skilled in art, indicates that the base element size T (1/f) in the vertical direction is about 160/20=8 (160 is the number of pixels in the vertical direction) pixels, i.e. the grid lines are separated by 8 pixels in the vertical direction. There are also peaks in multiples of 20, but they are of little interest (harmonics).

For unambiguous determination of positions of base elements in the image, also the phase offset of the row transition vector must be determined. It has already been determined how the grid lines are related to each other, and now it will be determined how they are related to the image. As is known to those skilled in the art, the phase offset can be determined as the phase offset=the angle$(X(k))/2\pi f$ ($X(k)$ is, as mentioned above, complex). In this case, the phase offset will be approximately equal to 3.7, i.e. the first grid line begins about 4 pixels under the upper edge in the image.

Correspondingly, the positions of the grid lines in the horizontal direction (these grid lines extend vertically) are determined based on the column transition vector. A grid is thus determined 408 based on the result of the FFT algorithm.

As an alternative to the discrete Fourier transform, the frequency and phase offset of the grid can possibly be determined using an algorithm to calculate the average distance between peaks in the row transition vector.

Figure 14:
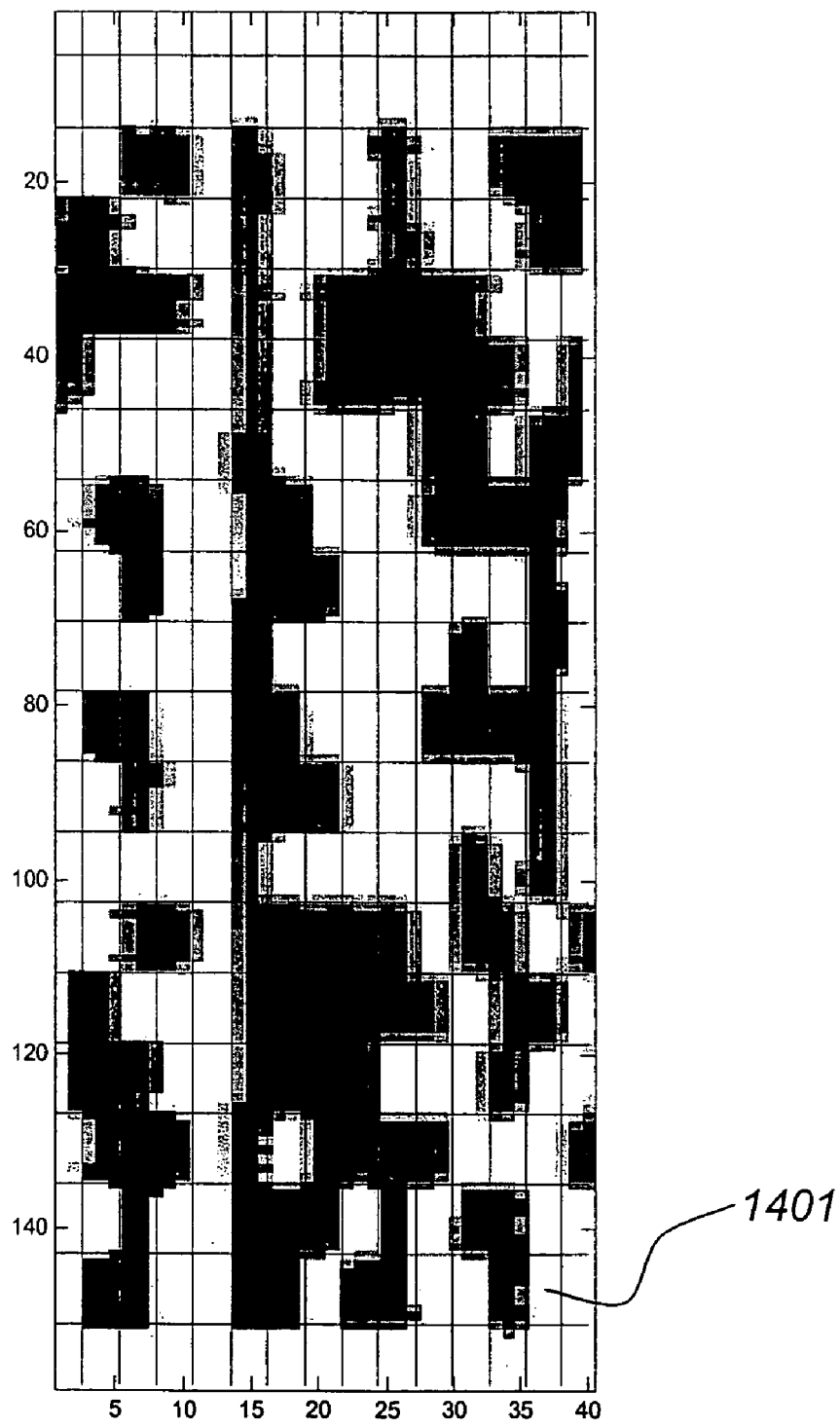
FIG. 14 shows the grid applied to the image in FIG. 8.

The appearance and location of the grid in the image in FIG. 8 is evident from FIG. 14. The grid constitutes base element position information and defines a number of grid segments 1401 (rectangles), which can be assumed to correspond to base elements. Thus, the analysis step 301 in FIG. 3 has been performed.

It should be mentioned that the above-described steps 401-408 may be repeated for all the images in the sequence. However, once the size of the grid segments has been determined, that information might be used to simplify calculations carried out for subsequent images.

Reconstruction

Figure 15:
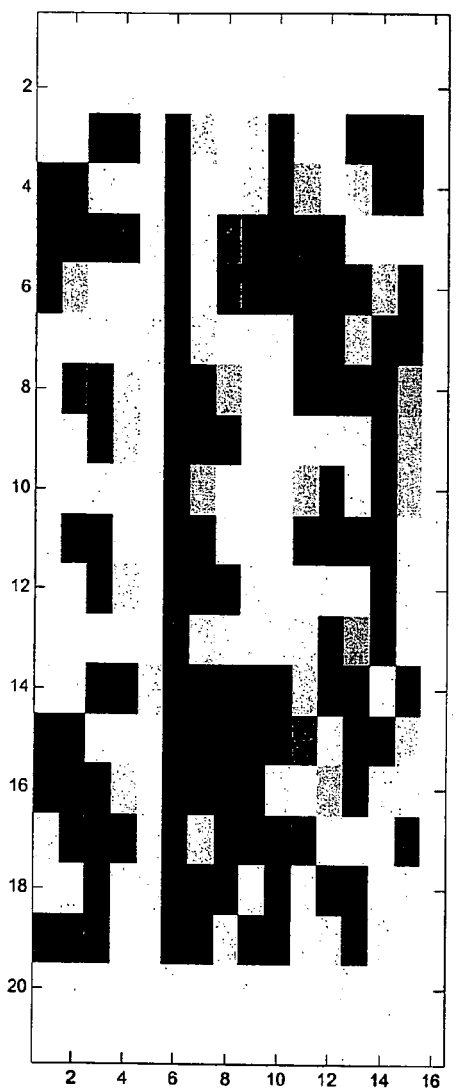
FIG. 15 shows the image of FIG. 14 after averaging of the pixel values in each base element, the different grey scales of the base elements representing their different values.
Figure 16:
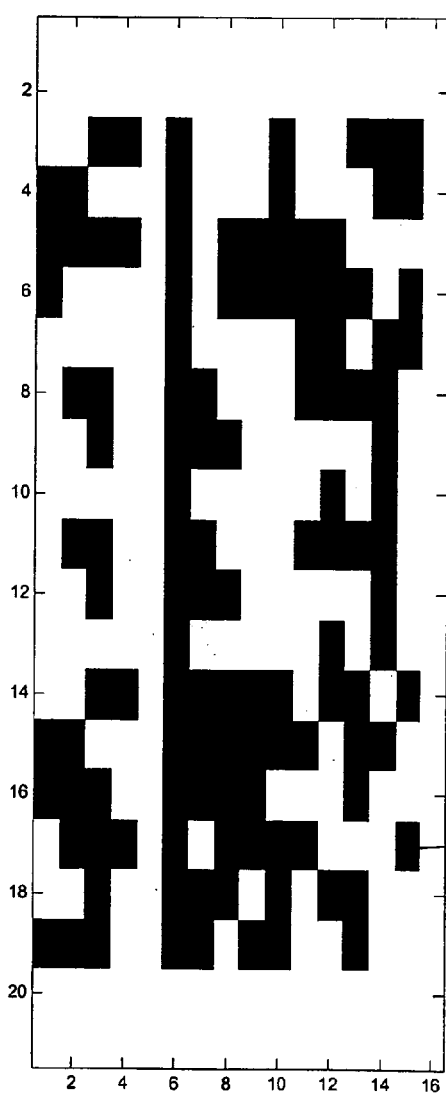
FIG. 16 shows a symbol image obtained after thresholding of the image of FIG. 15.

Now the bar code is to be reconstructed by using the contents of the various images and the base element position information of each image, i.e. the grid. This can be done in various ways. In one embodiment of the method, the grid is applied 409 to the rotated, but not binarised, image in FIG. 8. Values of base elements in the image are determined by means of the grid and the image. This can be done in such a manner that the average pixel value of all pixels in a grid segment is calculated and this value is thresholded/compared with a threshold value. If the value exceeds the threshold value, the base element is assumed to represent 1, otherwise 0. In the embodiment, greater weight is, however, attached to pixels in the centre of a segment than those being close to the borders that are defined by the grid. This is done since there may be a risk that the latter pixels in fact belong to the other base elements. Alternatively, the latter pixels are excluded completely from the calculation. The result of this operation before thresholding is shown in FIG. 15. The result after thresholding is shown in FIG. 16. The numbers at the borders of FIGS. 15 and 16 represent base element numbers.

The image in FIG. 16 corresponds to a representation of the values of the base elements in a restricted part of the bar code. The information contents of the volume of information that corresponds to the image in FIG. 16 is, of course, much smaller (21*16 elements) than in the original image in FIG. 5 (160*40 elements). The amount of data has thus been reduced. Therefore reconstruction of the bar code can be carried out in a considerably easier and quicker way starting from images corresponding to the image in FIG. 16. Thus a base element (for instance 1601 in FIG. 16) can now be represented by a single bit in the volume of information that corresponds to the image. Thus, a symbol image is generated 410, in which each base element is represented by a one or a zero, for each image in the sequence. The symbol image constitutes base element information.

Figure 17:
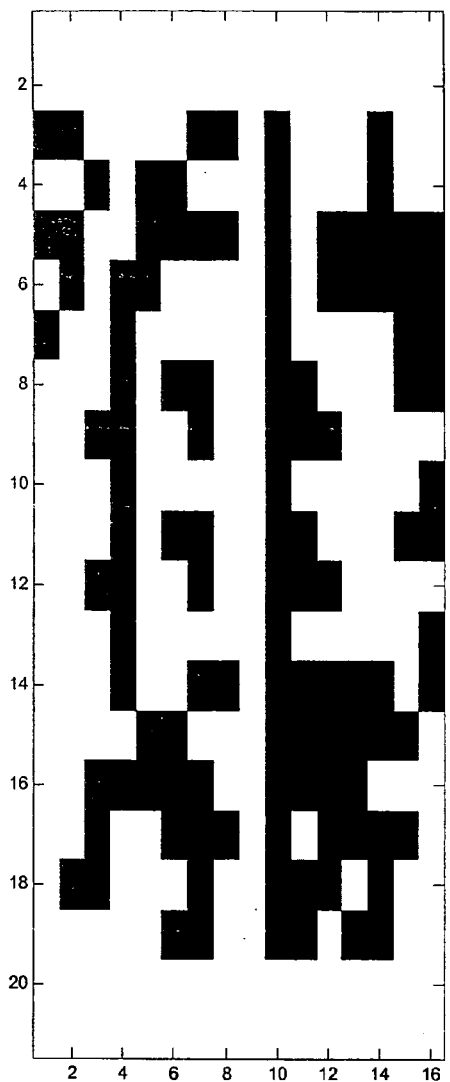
FIGS. 17 and 18 show two partially overlapping symbol images.
Figure 18:
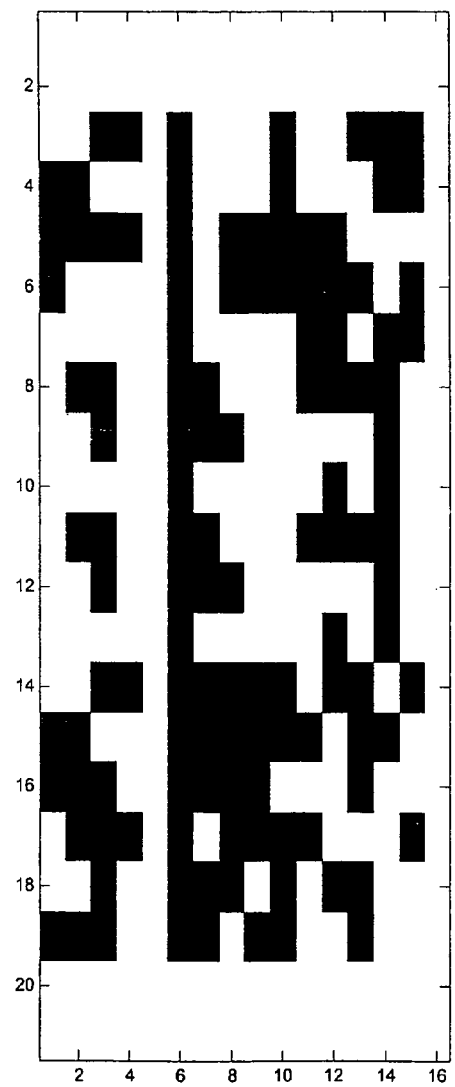

FIGS. 17 and 18 illustrate two such partially overlapping images that are to be put together 411 to a composite image. This can be easily done in a manner known per se by using a two-dimensional correlation algorithm which operates at base element level. By thus putting together all images in the sequence, the bar code is reconstructed to an entirety. Its information contents can now be interpreted and used in various applications.

Alternative

An example of a possible alternative embodiment will now be described in brief.

An incoming image is binarised, edges of the image are detected, and the main directions of extension (θ, θ+90) of the edges in the image are determined. No rotation of the image is made. Instead two vectors $v_\theta$, $v_{\theta+90}$ are created, which describe the existence of transitions in these directions in the image. For example, $v_\theta$ is obtained by letting a software function pace through the image along a number of paths in the direction θ, which paths are separated from each other. If a transition is detected, an element in $v_\theta$ is incremented. This element corresponds to an imaginary line which extends along the direction θ+90 in the image. Correspondingly, $v_{\theta+90}$ is obtained. The vectors $v_\theta$, $v_{\theta+90}$ can then be frequency analysed, as was done above in connection with the row transition and column transition vectors. As a result, an angled grid is obtained, which can be applied to the original, binarised image in FIG. 5. This image can now be put together with other corresponding images, for instance, as was done above in connection with the description of FIGS. 14-18. Alternatively, putting together can be done using a correlation process at pixel level, but supported by the obtained grids, which reduce the number of possible alternatives of combination and thus make putting together quicker.

The method for recording bar codes as described above can also be used for one-dimensional bar codes. In this case, the base element could e.g. correspond to the thinnest bar used in the one-dimensional bar code. Other bars of other widths can be represented by several base elements. The method is carried out as described above, but in one dimension only.

System for Recording a Bar Code

Figure 19A:
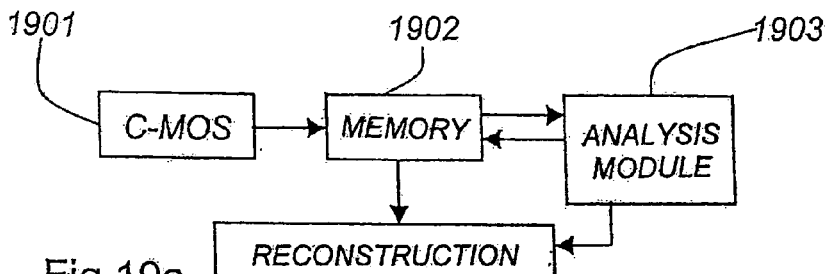
FIGS. 19a and 19b illustrate modules in a system for recording a bar code according to one embodiment of the invention.
Figure 19B:
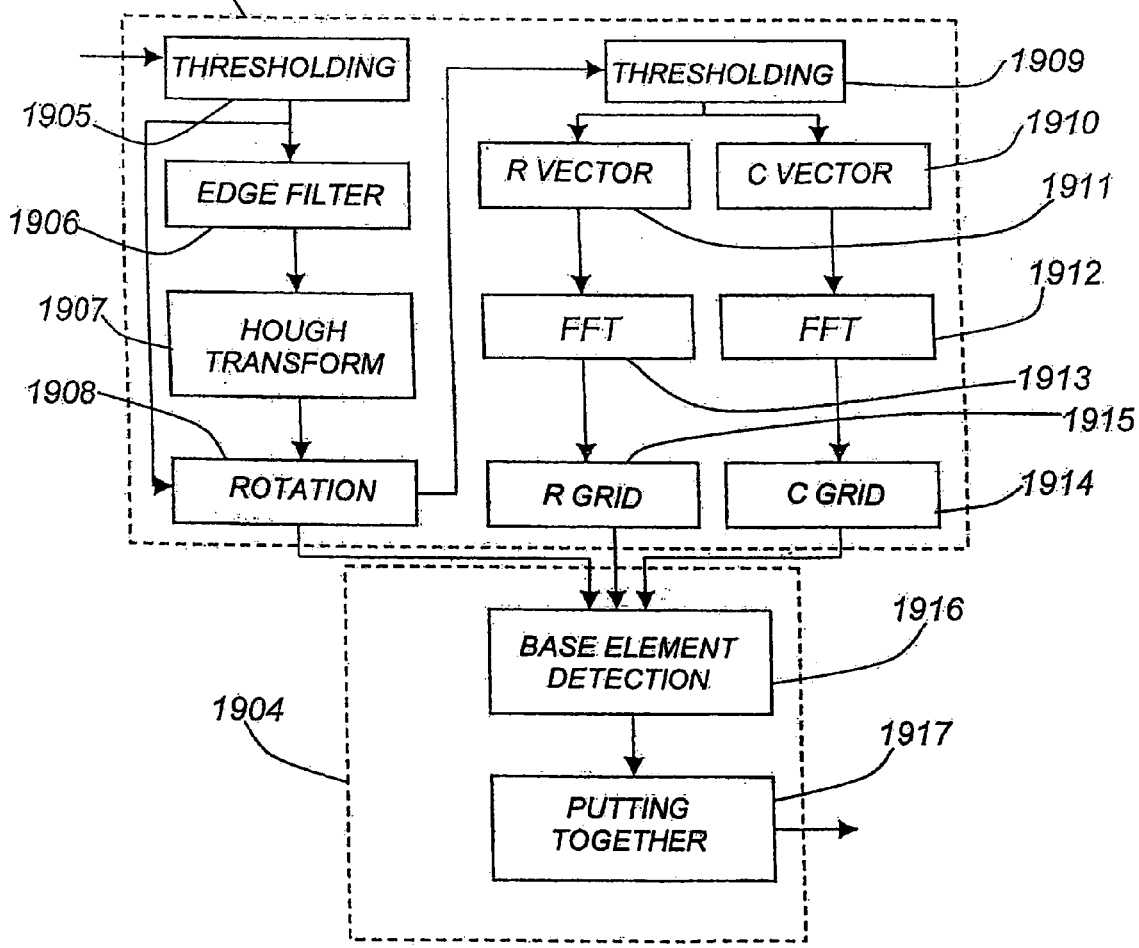

FIGS. 19*a* and 19*b* illustrate modules in a system for recording a bar code according to an embodiment of the invention.

FIG. 19*a* shows in general a system for recording a bar code using a reading device according to an embodiment of the invention. The system comprises an image sensor, suitably a CMOS image sensor 1901, which records a sequence of images when the reading device is passed across the bar code. These images are stored in a memory 1902. An analysis module 1903 analyses the images in the memory 1902 and thus creates base element position information, for instance in the form of a grid. The analysis module 1903 can both read and write information in the memory 1902, so that several versions, processed in the analysis, of an image can be stored in the memory 1902. Based on the recorded images and the sets of base element position information that are generated for each image in the analysis module 1903, a reconstruction module 1904 creates once more the bar code in its entirety. The reconstruction module can export a composite image describing the entire bar code, either at base element level or at pixel level. Alternatively, parts of a bar code which relate to parts of the bar code (for instance half the bar code) can be exported. In some cases, the bar code may contain redundant information that does not have to be recorded.

A further option implies that the reconstruction module 1904 also decodes the bar code and exports its information contents, for instance as a sequence of ASCII characters.

FIG. 19*b* shows in more detail functional modules in the analysis module 1903 and the reconstruction module 1904 according to an embodiment, which corresponds with the inventive method as shown in detail in FIG. 4. The functional modules can communicate with the memory 1902 in FIG. 19*a*.

In the analysis module there is a thresholding module 1905, which receives a grey-scale image reproducing part of a bar code, and binarises this. The edges of the binarised image are detected by an edge filter 1906. A Hough transform module 1907 finds the directions of extension of the edges in the image, and the binarised image is rotated, so that these directions of extension correspond with those of rows and columns in the image, by means of a rotating module 1908.

The rotated image is once more binarised by a thresholding module 1909. Then a column transition vector is created by a column transition vector module 1910 and a row transition vector by a row transition vector module 1911. The thus created column and row transition vectors are Fourier transformed by the respective FFT modules 1912, 1913, after which column and row grid modules 1914, 1915 generate grids based on the Fourier transforms.

With access to these grids, a base element detecting unit 1916 can determine the value of base elements in the image in order to obtain a base element image, and a putting-together unit 1917 can put together such base element images and thus reconstruct the bar code. The system in FIG. 19*b* can in its entirety be located in the bar code reader 201 in FIG. 2. Alternatively, functional modules in the system can be broken out to the system 202 which communicates with the bar code reader 201.

As will be appreciated by those skilled in the art, the above modules can be realised by software that is executed by a microprocessor. Alternatively, they can wholly or partly be realised by hardware in the form of an ASIC (Application Specific Integrated Circuit). Various combinations of hardware and software solutions are possible.

In brief a method of recording a bar code which comprises a plurality of base elements has been disclosed. A reading device generates a sequence of partially overlapping images which together reproduce the bar code. The images are analysed to produce information describing the positions of the base element in each image. Then the bar code is reconstructed by putting together information that has been extracted from the subimages, so that the contents of the bar code can be interpreted. In reconstruction, the position information and the images are used. By using the position information, the putting together process can be made less calculation-intensive. Also a corresponding device and a corresponding computer program have been disclosed.

The invention is not limited to the embodiments described above and can be varied within the scope of the appended claims. For instance, the images in the sequence of the images do not have to reproduce the entire height of the bar code. It is quite possible to carry out the reconstruction of the bar code in the vertical direction. The bar code reader can then be passed across the bar code several times, for instance, from the left to the right and row by row, or be zigzagged across the bar code, like a meander.

The invention can also be used for recording other types of bar codes than PFD417, for instance QR-CODE, SUPER-CODE, MAXICODE; DATAMATRIX; CP-CODE and CODEONE.

The invention claimed is:

1. A method for recording a bar code comprising a plurality of base elements, said method using a sequence of images from an image sensor, which together reproduce the bar code, images in the sequence being partially overlapping, said method comprising:

generating base element position information regarding borders of base elements in the images by analysing the images in the sequence;

using the base element position information for extracting, from the images, base element values, each of which is indicative of pixel values of a base element; and reconstructing the bar code using the base element values.

2. A method as claimed in claim 1, in which the generating one-dimensional data is created and frequency analysed for each image, said one-dimensional data describing the existence of intensity changes along a predetermined direction in the image.

3. A method as claimed in claim 2, in which said one-dimensional data for each image comprises a row transition vector, in which the elements have values which are representative of the amounts of intensity changes along a plurality of columns in the image, and a column transition vector, in which the elements have values which are representative of the amounts of intensity changes along a plurality of rows in the image.

4. A method as claimed in claims 2 or 3, in which the frequency analysis is performed using an FFT algorithm.

5. A method as claimed in claim 1 or 2, wherein the generating further comprises:
thresholding pixels in the image, so that the pixels assume one of two binary values;
generating a row transition vector, in which each element has a value which is representative of the number of transitions, in a plurality of columns in the image, from one binary value to the other between two adjoining rows;
generating a column transition vector, in which each element has a value which is representative of the number of transitions, in a plurality of rows in the image, from one binary value to the other between two adjoining columns; and
frequency analysing the row transition vector and the column transition vector.

6. A method as claimed in claim 1, in which the base element position information is a grid which defines the borders of the base elements in the image, and is applied to the image.

7. A method as claimed in claim 6, wherein the algorithm that determines the value of the base element is configured in such a manner that pixels at a great distance from the borders of a base element have greater weight than pixels close to the borders.

8. A method as claimed in claim 1, in which the base element value for each base element has less information contents than the corresponding part of the original image.

9. A method as claimed in claim 8, in which the base element value of each base element is represented by a bit.

10. A method as claimed in claim 1, in which the bar code is a two-dimensional bar code.

11. A method as claimed in claim 10, in which the bar code is a type PDF417 bar code.

12. A method as claimed in claim 1, in which the base element position information for an image in the sequence is produced by determining, from the content of the image, a grid which indicates the borders of the base elements in the image.

13. A method as claimed in claim 12, further comprising creating a binary base element representation of the image by representing each base element in the image with a single binary value.

14. A method as claimed in claim 13, in which the bar code is reconstructed by correlating binary base element representations created from the images in the sequence.

15. A method as claimed in claim 1, wherein the generating further comprises:
detecting edges in an image;
detecting directions of extension of the edges in the image; and
rotating the image, so that the directions of extension of the edges correspond to the direction of extension of rows or columns of pixels in the image.

16. A method as claimed in claim 15, wherein the detection of the directions of extension of the edges is performed using a Hough transform.

17. A method for recording a bar code comprising a plurality of base elements, said method using a sequence of images from an image sensor, which together reproduce the bar code, images in the sequence being partially overlapping, said method comprising:
a) generating base element position information regarding borders of base elements in the images by analysing the images in the sequence, wherein the generating further comprises
detecting edges in an image,
detecting directions of extension of the edges in the image, and
rotating the image, so that the directions of extension of the edges correspond to the direction of extension of rows or columns of pixels in the image; and
b) reconstructing the bar code by using the contents of the various images and the base element position information.

18. A method as claimed in claim 17, in which the detection of the directions of extension of the edges is performed using a Hough transform.

19. A system for recording a bar code comprising a plurality of base elements, which system uses a sequence of images which together reproduce the bar code, images in the sequence being partially overlapping, which system comprises:
means for generating base element position information regarding borders of base elements in the images by analysing the images in the sequence;
means for using the base element position information for extracting, from the images, base element values, each of which is indicative of pixel values of a base element; and
means for reconstructing the bar code using the base element values.

20. A system as claimed in claim 19, in which the bar code is a type PDF417 bar code, and the vertical extension of the images is such as to allow them to cover the full height of the bar code.

21. A computer readable medium comprising a program for recording a bar code comprising a plurality of base elements, a sequence of images from an image sensor being used, which together reproduce the bar code, images in the sequence being partially overlapping, wherein the program comprises instructions for
generating borders of base elements in the images by analysing the images in the sequence,
using the borders for extracting, from the images, base element values, each of which is indicative of pixel values of a base element, and
reconstructing the bar code using base element values.

22. A system for recording a bar code comprising a plurality of base elements, which system uses a sequence of partially overlapping images which together reproduce the bar code, comprising:
a module which generates base element position information regarding borders of base elements in the images by analysing the images in the sequence;

a module which uses the base element position information for extracting, from the images, base element values, each of which is indicative of pixel values of a base element; and a module which reconstructs the bar code using the base element values.

* * * * *